(12) United States Patent
Krishnamoorthy et al.

(10) Patent No.: US 8,277,198 B2
(45) Date of Patent: Oct. 2, 2012

(54) FAN MOTOR CONTROL SYSTEMS

(75) Inventors: Ravishanker Krishnamoorthy, Singapore (SG); Foo Leng Leong, Singapore (SG); Edy Susanto, Singapore (SG); Yayue Zhang, Singapore (SG); Cheng Yong Teoh, Singapore (SG)

(73) Assignee: Marvell International Ltd., Hamilton (BM)

( * ) Notice: Subject to any disclaimer, the term of this patent is extended or adjusted under 35 U.S.C. 154(b) by 494 days.

(21) Appl. No.: 12/469,196

(22) Filed: May 20, 2009

(65) Prior Publication Data

US 2010/0119386 A1    May 13, 2010

Related U.S. Application Data

(60) Provisional application No. 61/114,168, filed on Nov. 13, 2008.

(51) Int. Cl.
*F04B 49/06* (2006.01)
*F04B 35/04* (2006.01)

(52) U.S. Cl. .... 417/44.1; 417/44.11; 417/45; 417/423.1

(58) Field of Classification Search .......... None
See application file for complete search history.

(56) References Cited

U.S. PATENT DOCUMENTS

| | | | |
|---|---|---|---|
| 4,928,043 A * | 5/1990 | Plunkett | 318/400.34 |
| 5,467,025 A | 11/1995 | Ray | |
| 6,456,031 B1 | 9/2002 | Gallegos-Lopez et al. | |
| 6,586,903 B2 | 7/2003 | Moriarty | |
| 6,664,749 B2 | 12/2003 | Heydt et al. | |
| 7,026,774 B2 | 4/2006 | Inaba et al. | |
| 7,057,362 B2 | 6/2006 | Norman | |
| 2006/0197479 A1* | 9/2006 | Wang et al. | 318/254 |

OTHER PUBLICATIONS

Brushless DC Electric Motor; Wikipedia, the free encyclpedia; http://en.wikipedia.org/wiki/Brushless_DC_electric_motor; Apr. 29, 2009; 6 pages.
U.S. Appl. No. 61/118,820, filed Dec. 2008, Leong et al.
U.S. Appl. No. 12/480,161, filed Jun. 2009, Leong et al.
U.S. Appl. No. 12/417,680, filed Apr. 2009, Leong et al.
U.S. Appl. No. 12/480,259, filed Jun. 2009, Leong et al.

* cited by examiner

*Primary Examiner* — Anh Mai
*Assistant Examiner* — Britt D Hanley

(57) ABSTRACT

A control system for a fan includes a control housing that is external to a fan housing for the fan. At least one fan control module is within the control housing and communicates remotely with terminals within the fan housing via at least one wire. The at least one fan control module includes a detection module. The detection module detects induced voltages in at least one of a plurality of stator coils within the fan housing via the at least one wire without receiving signals from a sensor in the fan housing.

24 Claims, 8 Drawing Sheets

FAN MOTOR CONTROL SYSTEMS

CROSS-REFERENCE TO RELATED APPLICATIONS

This application claims the benefit of U.S. Provisional Application No. 61/114,168, filed on Nov. 13, 2008. The disclosure of the above application is incorporated herein by reference in its entirety.

FIELD

The present disclosure relates to motors, and particularly to fan motor control systems and methods.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Cooling fan assemblies may provide airflow to dissipate heat generated by electronic components. Cooling fan assemblies may include a motor that drives fan blades via a rotor. Traditional cooling fan assemblies include a printed circuit board (PCB) mounted inside the motor. Fan control modules and Hall-effect sensors are mounted on the PCB to control the motor.

Referring now to FIG. 1, a cooling fan system 100 includes a PCB 101 mounted in a motor 102. A motor control module 104 is mounted on the PCB 101. A plurality of wires 105 may electrically connect the PCB 101 to a host device (not shown) via terminals 106 on the PCB 101. An example of a host device is a personal computer.

The motor 102 may include a two-phase brushless direct current (DC) motor. The motor 102 may include four stator poles: pole A1 107, pole A2 108, pole B1 110, and pole B2 112. Each of the stator poles may be wound with stator coils 114. Pole A1 107 and pole A2 108 may collectively be called "pole pair A." Pole B1 110 and pole B2 112 may collectively be called "pole pair B."

The motor control module 104 may apply a voltage and/or current to the stator coils 114 of pole pair A to generate a magnetic field between pole A1 107 and pole A2 108. Applying the voltage and/or current to the stator coils 114 of pole pair A may be called "driving phase A." The motor control module 104 may provide the voltage and/or current to the stator coils 114 of pole pair B to generate a magnetic field between pole B1 110 and pole B2 112. Applying the voltage and/or current to the stator coils 114 of pole pair B may be called "driving phase B."

The motor 102 includes a rotor 116. The rotor 116 may include at least one permanent magnet. The motor control module 104 may drive phase A and/or phase B to actuate the rotor 116 about an axle 118. The axle 118 may mechanically couple the rotor 116 to a fan 120. While the rotor 116 in FIG. 1 rotates between the stator poles 107, 108, 110, 112, the motor 102 may include a rotor that surrounds the stator poles 107, 108, 110, 112.

The motor control module 104 may alternate between driving phase A and driving phase B to actuate the rotor 116. At least one Hall-effect sensor 122 may be mounted on the PCB 101 to provide an indication of rotation of the rotor 116. For example, the Hall-effect sensor 122 may generate a pulse when a magnetic pole of the rotor 116 passes the Hall-effect sensor 122. The motor control module 104 may determine whether the rotor 116 is rotating based on the pulses from the Hall-effect sensor 122.

SUMMARY

A control system for a fan includes a control housing that is external to a fan housing for the fan. At least one fan control module is within the control housing that communicates remotely with terminals within the fan housing via at least one wire. The at least one fan control module includes a detection module. The detection module detects induced voltages in at least one of a plurality of stator coils within the fan housing via the at least one wire without receiving signals from a sensor in the fan housing.

In other features, the control housing corresponds to a connector. The connector communicates with a host device control module that is external to the connector and the fan housing. The fan housing is external to the connector. The induced voltages correspond to back electromotive force. The at least one fan control module further includes a speed control module. The speed control module provides a signal to adjust a rotational speed of a rotor within the fan housing based on the induced voltages. The at least one fan control module further includes a power control module that selectively provides power signals to the plurality of stator coils based on the signal from the speed control module.

In other features, the detection module detects the back electromotive force in the at least one of the plurality of stator coils. The detection occurs when the at least one of the plurality of stator coils is not receiving one of the power signals. The at least one wire corresponds to a first wire and a second wire. The first wire connects to the first terminal and the second terminal. The second wire connects to the third terminal In other features a fan system includes the control system and further includes fan blades. The fan housing is sensorless. The fan housing houses a fan motor. The fan motor includes the terminals and a stator. The stator includes N poles that are wound with the plurality of stator coils, respectively. Each of the plurality of stator coils communicates with one of the terminals. The rotor that rotates in response to the power signals. The fan blades rotate based on rotation of the rotor. N is an integer greater than 1.

In other features, the at least one wire directly communicates with one of the terminals without communicating with an intervening printed circuit board. The fan housing and the fan blades are sized based on sizes of the stator and the rotor without the intervening printed circuit board. The system also includes a sensorless printed circuit board. The at least one wire communicates with one of the terminals via the sensorless printed circuit board. The fan motor includes at least one of a one-phase brushless direct current motor, a two-phase brushless direct current motor and a three-phase brushless direct current motor.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

The present disclosure will become more fully understood from the detailed description and the accompanying drawings, wherein.

DESCRIPTION

Figure 1:
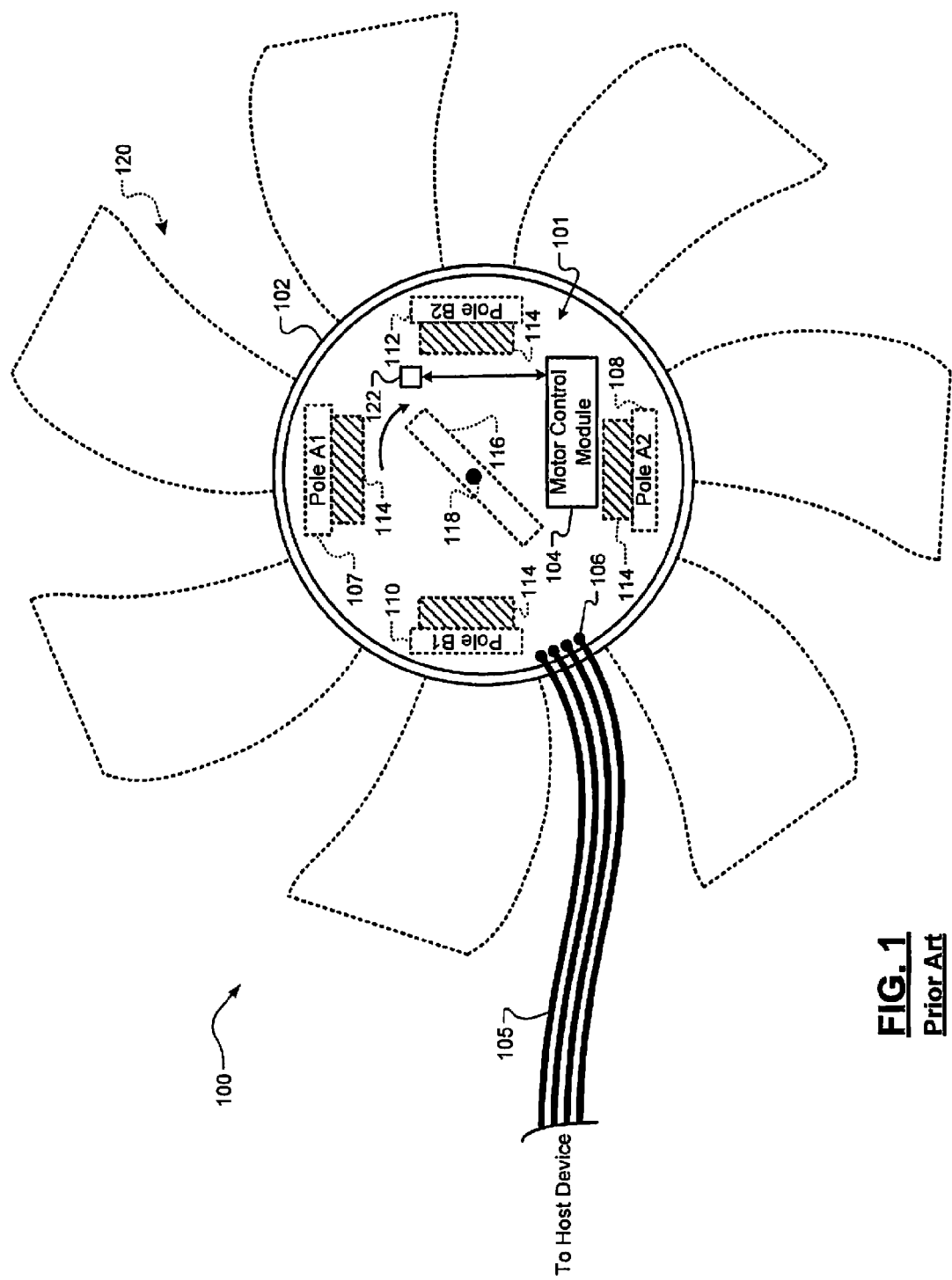
FIG. 1 is a fan system according to the prior art.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Traditional fan assemblies include a printed circuit board (PCB) mounted inside a motor that is housed in a housing. Fan electronics, such as fan control modules and Hall-effect sensors, were mounted on the PCB to control the motor. Thus, the housing for the fan assembly was physically accessed and/or disassembled in order to alter fan electronics on the PCB. Further, size of the fan assembly was largely dependent on the size of the PCB, as the fan assembly needed to be large enough to enclose the PCB.

Accordingly, motor control for the present disclosure is positioned external to the housing for the fan assembly and may include one or more modules. The motor is not dependant on the type of motor control used. In one embodiment a first motor control system is used that is later replaced with a second motor control system without physically accessing (e.g., opening) the housing for the fan assembly. The first and second motor control systems may or may not include the same functionality. Further, the fan assembly may not include a Hall-effect sensor. Therefore, a PCB for the present disclosure may be minimized or removed entirely from the fan assembly. Further, although embodiments described herein are directed to fan systems, the present disclosure is not limited to fan systems.

Figure 2A:
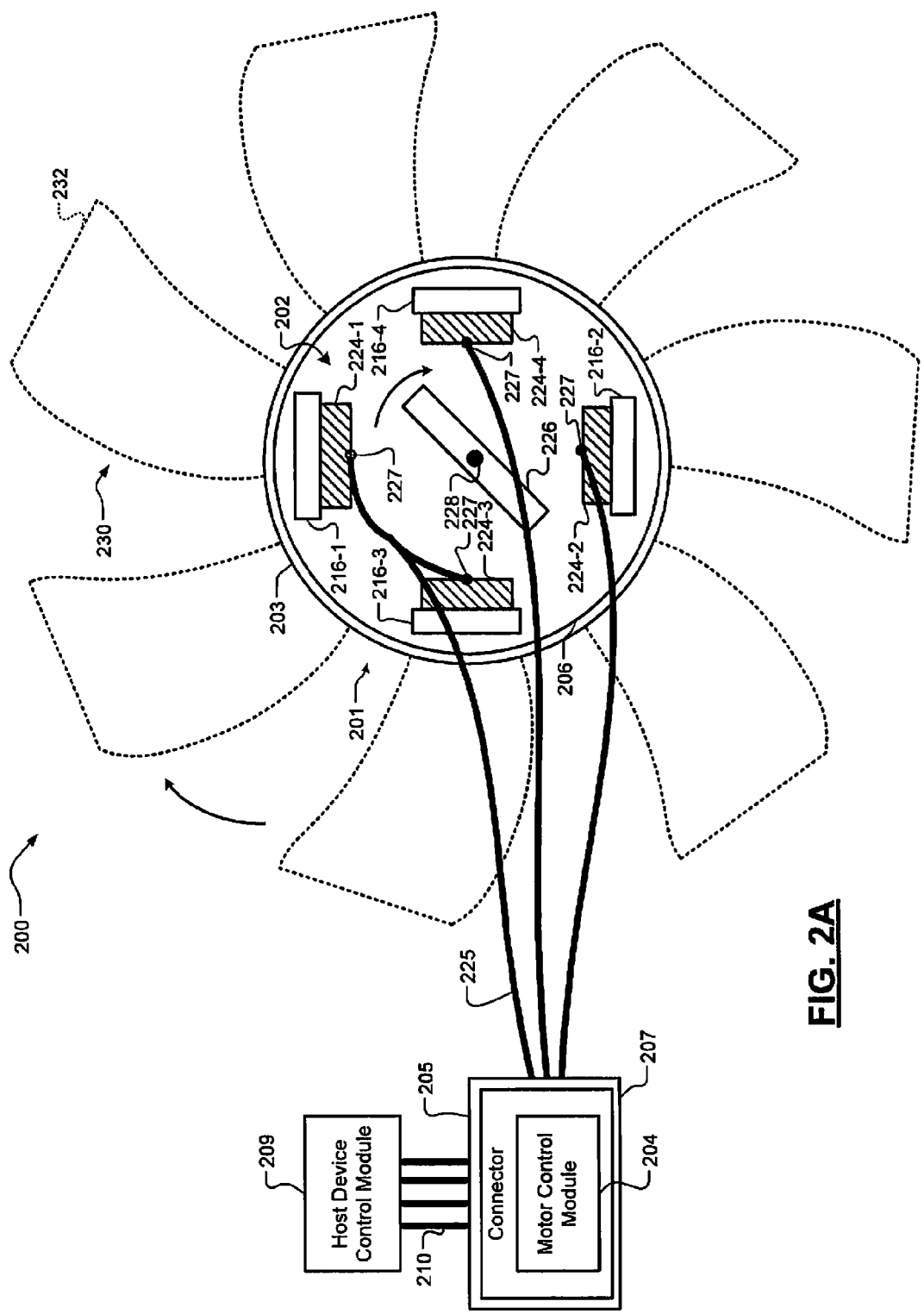
FIG. 2A is a fan system according to a first embodiment of the present disclosure.

Referring now to FIG. 2A, an example of a motor system 200 according to the present disclosure includes a fan assembly 201 that includes a motor 202 at least partially housed in a housing 203. The fan system 200 also includes a motor control module 204 that is external to the housing 203 and that controls the motor 202. A connector 205 may include a housing 207 that houses the motor control module 204. The connector 205 may interface with a host device control module 209 via wires 210. The host device control module 209 may be, for example, a control module of a personal computer. The control module for the personal computer may be coupled to a PCB (not shown) that is remote from the fan assembly 201.

Figure 2B:
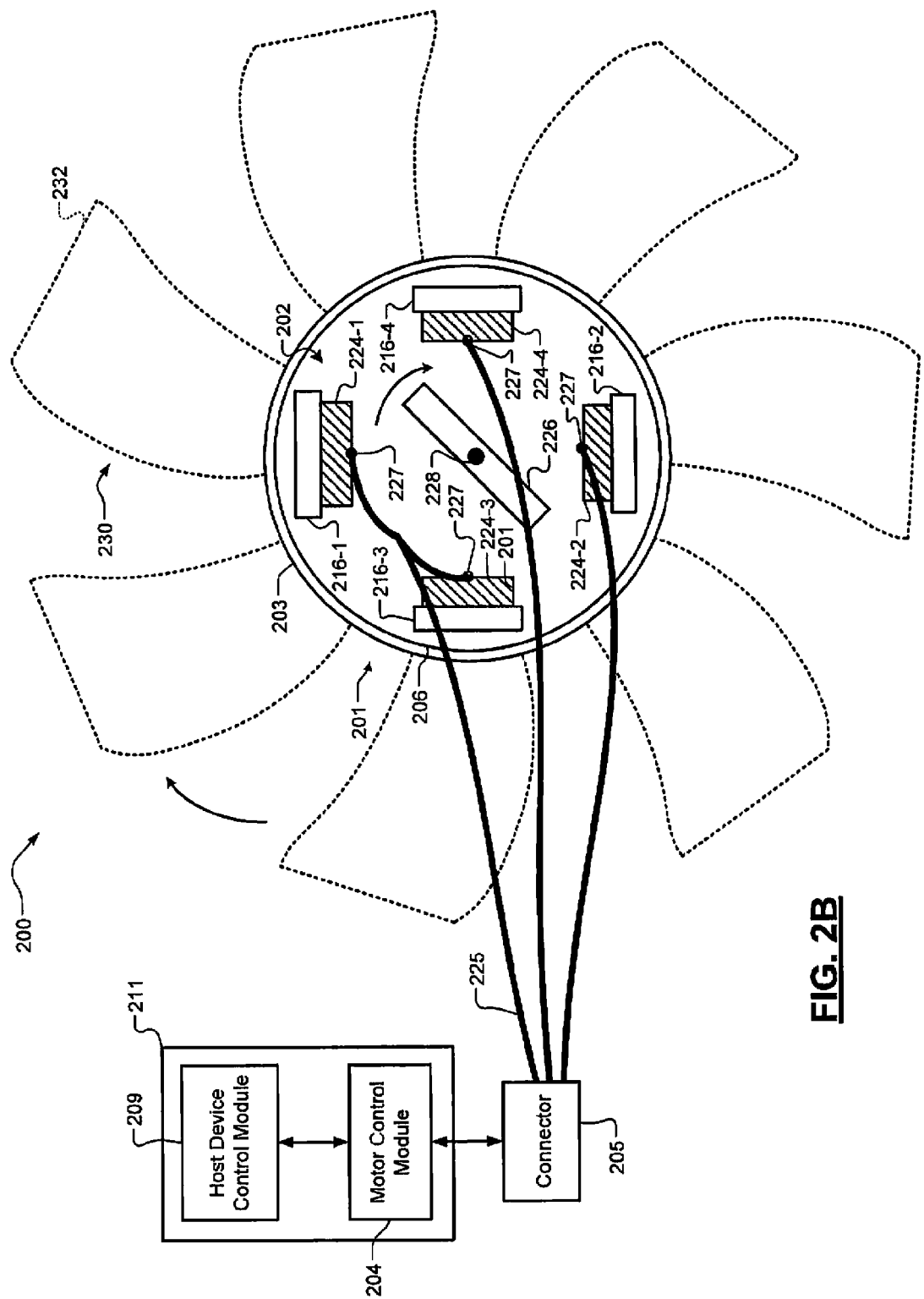
FIG. 2B is a fan system according to a second embodiment of the present disclosure.

Referring now to FIG. 2B, the motor control module 204 may be external to the connector 205. In one embodiment, the motor control module 204 may be coupled to a common PCB 211 with the host device control module 209. The common PCB 211 may include a motherboard when a personal computer is used as the host device.

For example only, the motor 202 may include a two-phase brushless DC motor. While the inductive sensing system is described using the two-phase brushless DC motor, the inductive sensing system may also be implemented in other motor systems (e.g., one-phase or three-phase motor systems).

In one embodiment, the motor 202 may include a stator 206 that includes four stator poles: pole A1 216-1, pole A2 216-2, pole B1 216-3, and pole B2 216-4 (referred to as stator poles 216). Each of the stator poles 216 may be wound with stator coils 224-1, 224-2, 224-3, 224-4 (referred to as stator coils 224), respectively. The motor control module 204 may communicate with the stator poles 216 via wires 225 that communicate with terminals 227 on the stator poles 216. In FIG. 2B, three wires 225 are illustrated, and two of the terminals 227 are shorted together. Alternative embodiments include numerous different wire and terminal arrangements, such as four wires 225 that individually connect to a respective one of the terminals 227.

The motor 202 includes a rotor 226 that may include at least one permanent magnet (not shown) An axle 228 may mechanically couple the rotor 226 to a fan 230 that includes a plurality of fan blades 232.

Figure 2C:
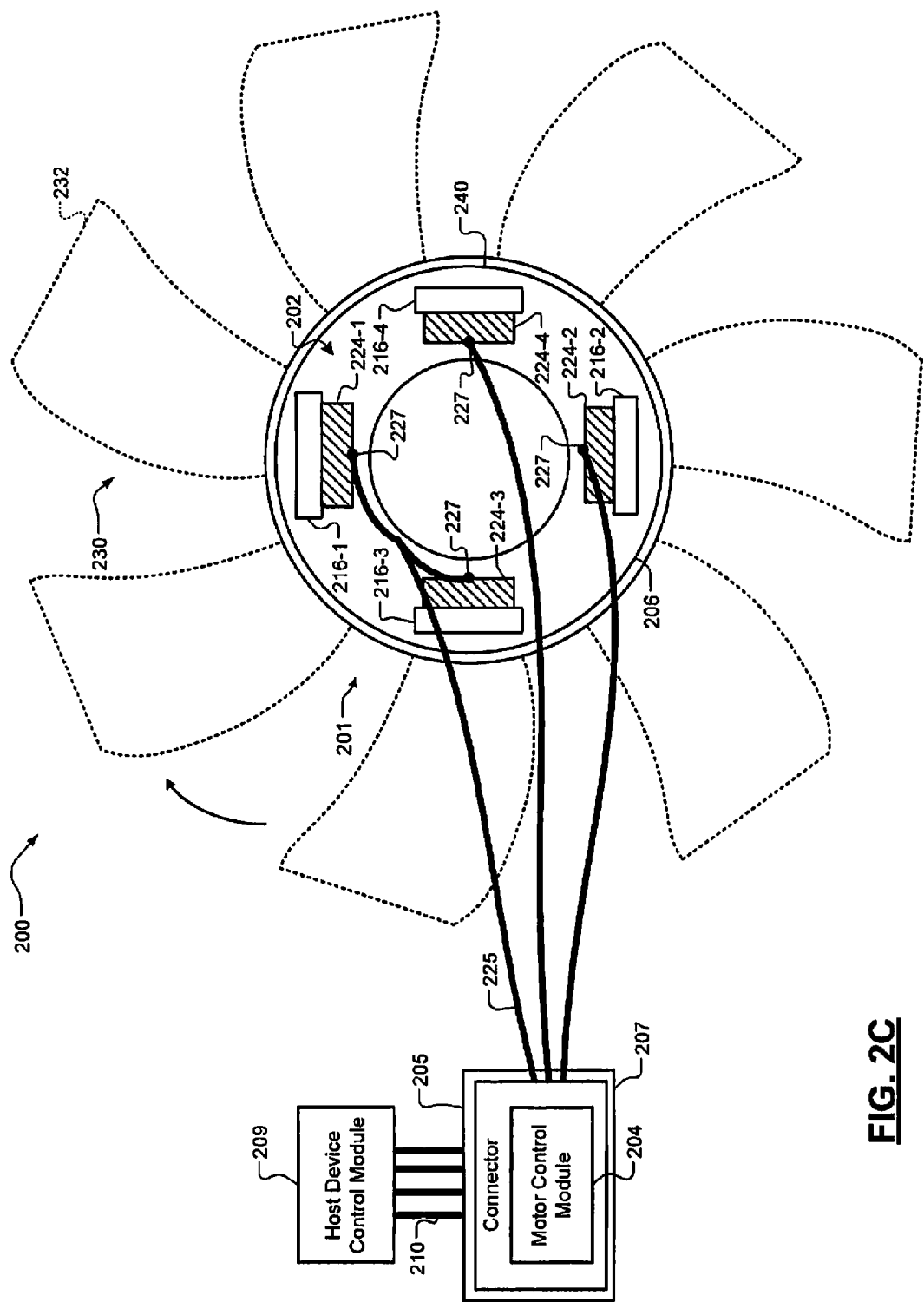
FIG. 2C is a fan system according to a third embodiment of the present disclosure.

Referring now to FIG. 2C, an alternative embodiment of a fan system 200 is shown. While the rotor 226 in FIG. 2A rotates between the stator poles 216, the motor 202 may instead include a rotor 240 that surrounds the stator poles 216. The rotor 240 may therefore rotate around the stator poles 216 in response to voltage/current supplied to the stator poles 216.

Figure 2D:
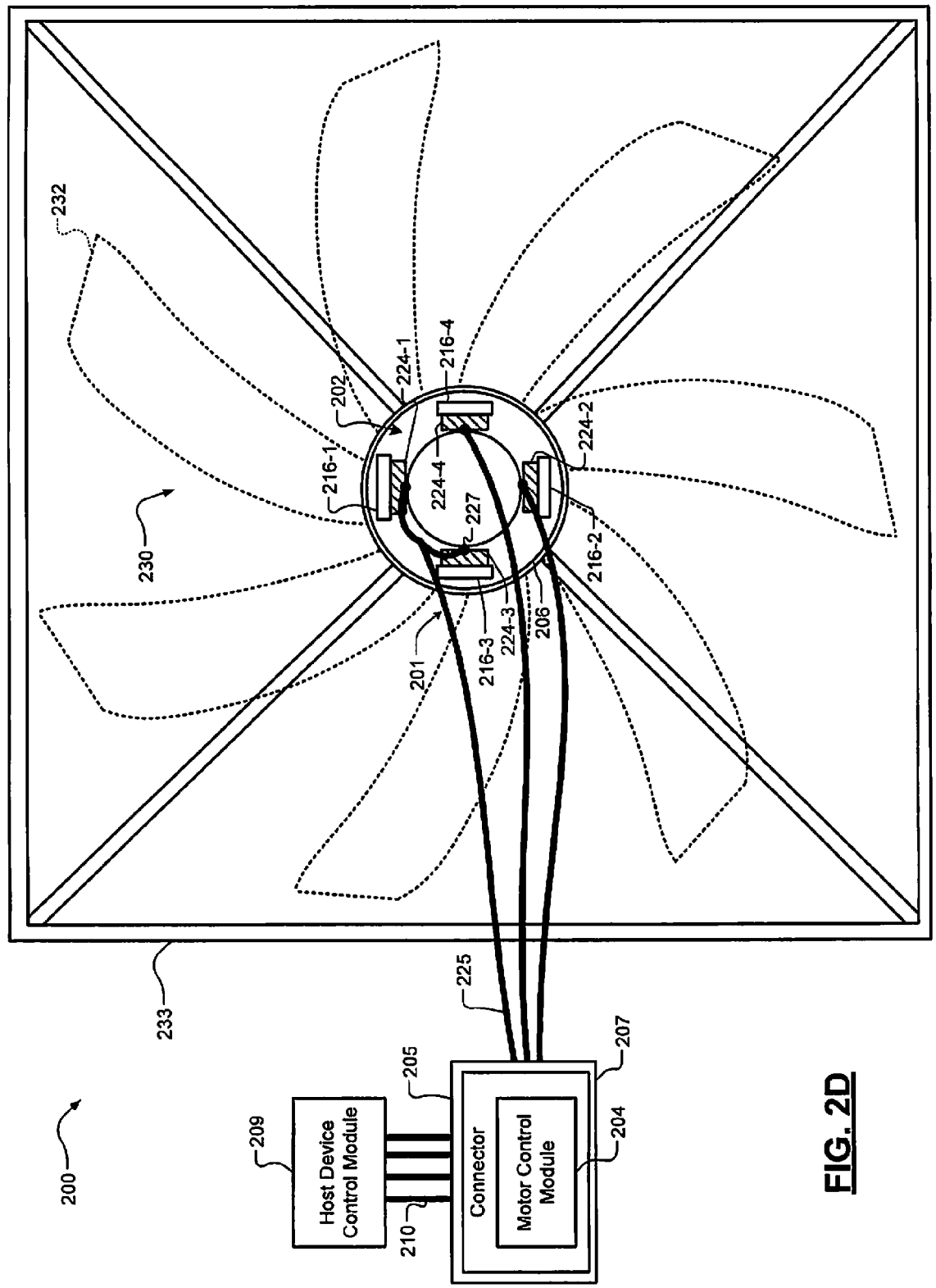
FIG. 2D is a fan system according to a fourth embodiment of the present disclosure.

Referring now to FIG. 2D, an alternative embodiment of a fan system 200 is shown. In FIG. 2D, the fan blades 232 are larger as compared with the fan assembly 201. Traditionally, the combined size of fan assemblies and fan blades was restricted to predefined limits. Traditional fan assemblies could not be made smaller because of the internal PCBs and Hall-effect sensors.

In the present disclosure, the traditional PCB and Hall-effect sensor have been removed from the fan assembly 201. Therefore, the fan assembly 201 may be made smaller while the fan blades 232 may be made larger. However, the combined size of the fan assembly 201 and the fan blades 232 may remain substantially the same. The increased size of the fan blades 232 allows an increased air flow for the same amount of power provided to the coils 224.

Further, the fan assembly 201 and fan blades 232 may be mounted in a fan case 233. Typical sizes for fan cases include 60 mm, 80 mm, 92 mm and 120 mm. The fan case 233 may be mounted in a host device, such as a personal computer. The fan assembly 201, as in FIG. 2D, may be implemented using either of rotors 226, 240 from FIGS. 2A and 2C, respectively.

Figure 2E:
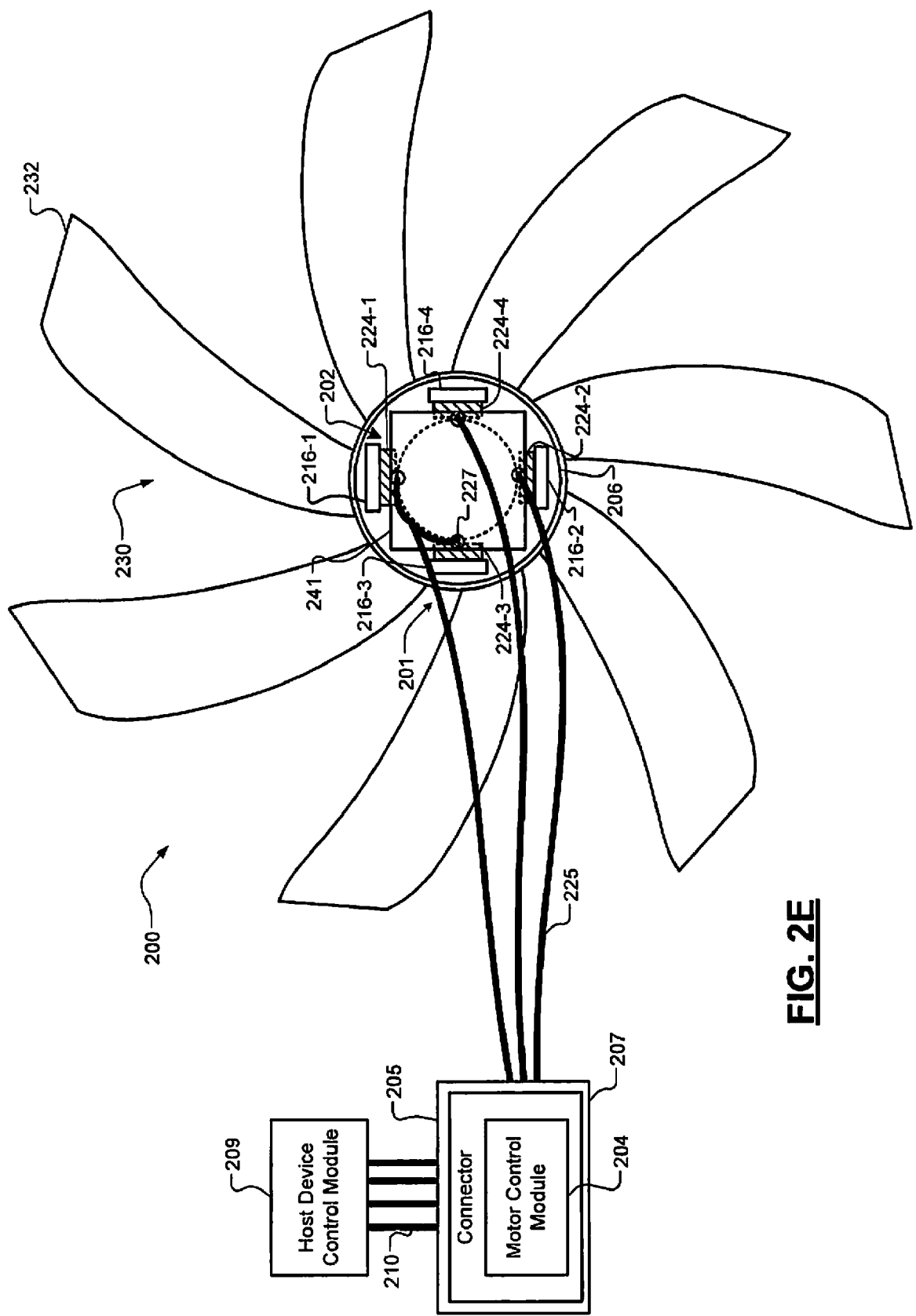
FIG. 2E is a fan system according to a fifth embodiment of the present disclosure.

Referring now to FIG. 2E, a PCB 241 may be included in the fan assembly 201 to provide mechanical stability for electrical connections in the fan assembly 201. In one embodiment, the wires 225 may be connected to the PCB 241 that communicates with terminals 227 rather than, as in FIGS. 2A-2D, directly soldered or otherwise directly connected to the terminals 227. The PCB 241 may not include control functionality, such as a control module and Hall-effect sensor, for the fan system 200.

Figure 3:
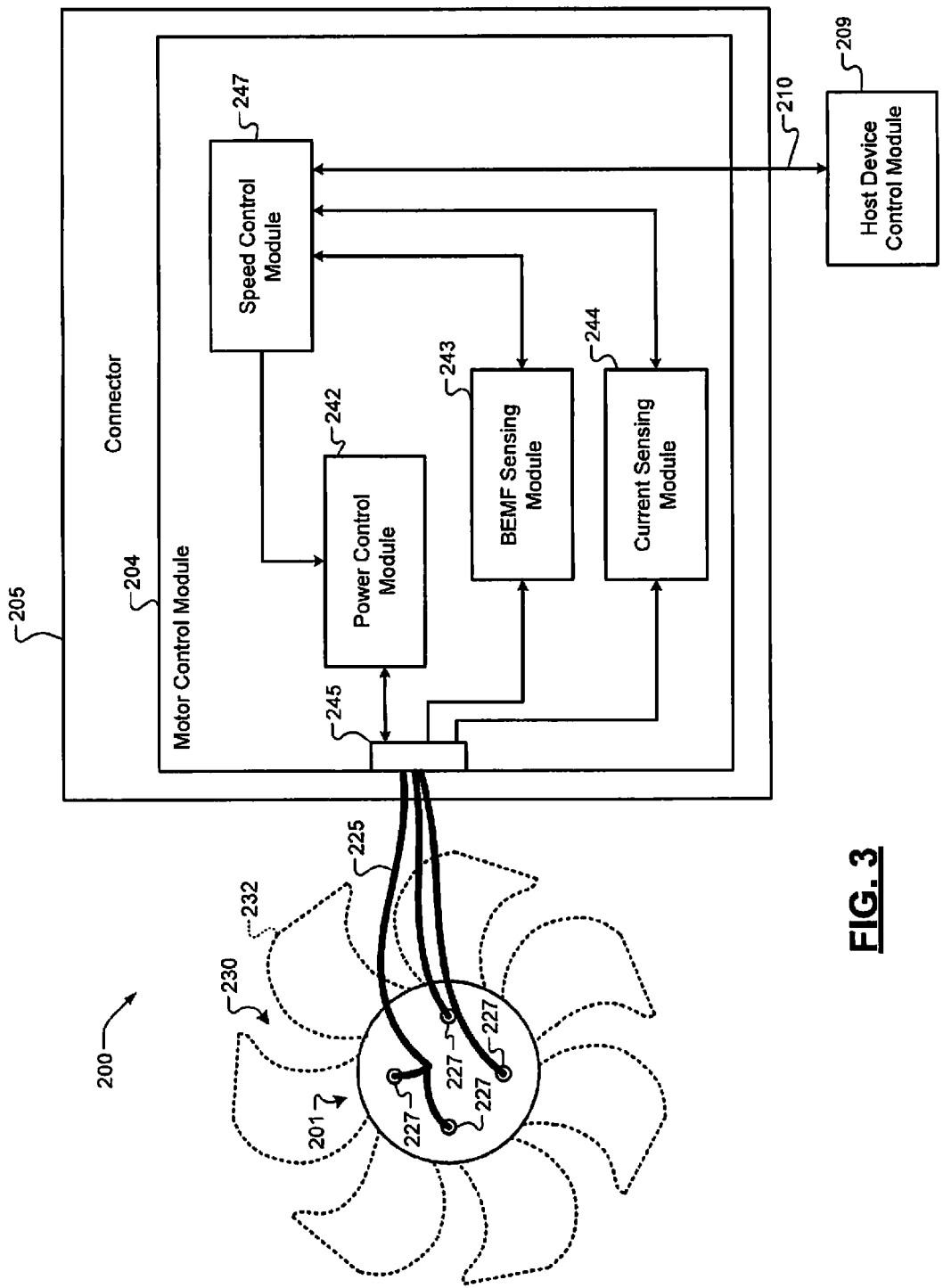
FIG. 3 is a more detailed view of a control for a fan system according to the present disclosure.

Referring now to FIG. 3, the motor control module 204 may include a power control module 242, a speed control module 247, a back electromotive force (BEMF) detection module 243, and a current detection module 244. The power control module 242, BEMF detection module 243, and current detection module 244 may communicate with terminals 227 on the fan assembly 201 via an interface 245.

The power control module 242 may apply a voltage and/or current to one or more of the stator coils 224. For example, the power control module 242 may alternate between driving stator coils 224-1, 224-2 and 224-3, 224-4 to rotate the rotor 226. The BEMF detection module 243 may detect BEMF voltage from undriven ones of the stator coils 224.

In a stator coil that is not powered, a BEMF voltage having a sinusoidal waveform is generated by the magnets in the rotor 226. Specifically, as the permanent magnets of the rotor 226 pass by the unpowered stator coil (e.g. 224-4), a current is induced in the unpowered stator coil 224-4.

In one embodiment, the power control module 242 initially provides voltage and/or current to stator coils 224-1, 224-2 but not stator coils 224-3 and/or 224-4. The BEMF detection module 243 detects BEMF from stator coil 224-3 and/or stator coil 224-4. The speed control module 247 determines when the magnets of the rotor pass by the stator coil 224-3 and/or the stator coil 224-4 based on signals from the BEMF detection module 243. The speed control module 247 may include data indicating distances between and/or positions of the stator poles 216.

In an alternative embodiment, a current detection module 244 detects current at each of the stator coils 224. The speed control module 247 determines positions of the stator poles 216 based the on detected current and the detected BEMF.

The speed control module 247 may determine the rotational speed of the rotor 226 based on the waveform of the detected BEMF and the position of the stator poles 216. In this way, the motor control module 204 can measure the rotation speed of the motor 202 and/or determine that the rotor 226 is not moving and/or is stuck. The speed control module 247 may generate control signals to adaptively adjust the rotation speed of the motor 202 to a desired value.

Figure 4:
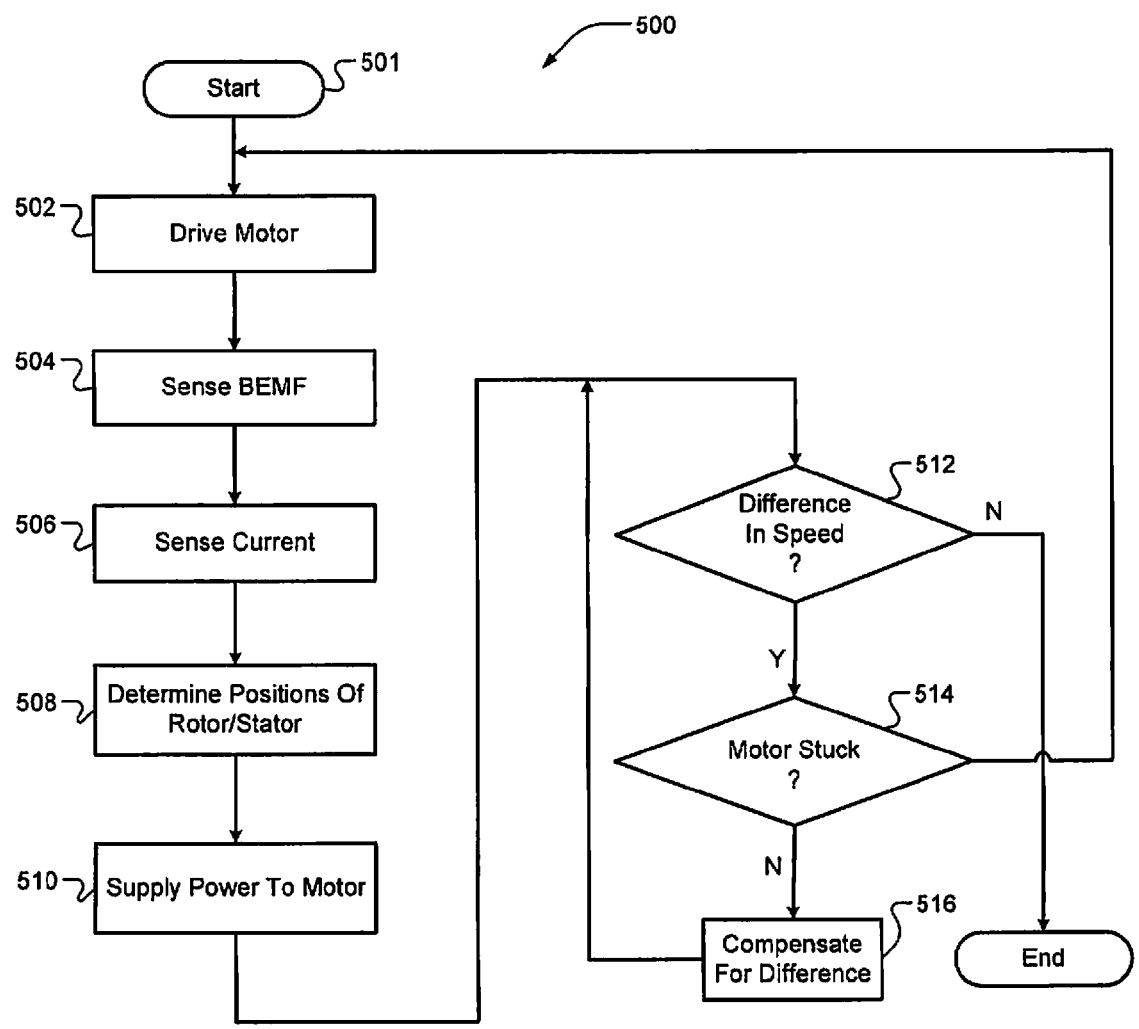
FIG. 4 is a flowchart that illustrates a method for operating a motor according to the present disclosure.

Referring now to FIG. 4, a method 500 for operating a motor system 200 is illustrated. Control starts in step 501. In step 502, the power control module 242 drives the motor 202. In one embodiment, the power control module 242 rotates the rotor 226 by supplying a drive current or drive voltage to the plurality of stator coils 224. In step 504, the BEMF detection module 243 detects the BEMF from the stator coils that are not supplied with the drive current or the drive voltage. In step 506, the current detection module 244 senses current at the terminals 227.

In step 508, the speed control module 247 determines the relative positions of the stator 206 and the rotor 226 based on the detected BEMF and/or detected current. The speed control module 247 selects a stator coil from the plurality of stator coils according to the detected relative positions. In step 510, the power control module 242 supplies the drive current or the drive voltage to the selected drive coil to rotate the rotor 226 in a predetermined direction at a desired speed.

In step 512, the speed control module 242 may determine that the speed of the rotor 226 differs from a desired speed based on the BEMF and/or the current detected from motor 202. In one embodiment, the speed control module 247 may measure a difference (i.e., an error) between the desired speed and the measured speed. The speed control module 247 may receive the desired speed from, for example, the host device control module 209.

In step 514, if there is a difference between actual and desired speeds, the speed control module 247 may determine whether the motor 202 is stuck. In step 514, if the motor 202 is stuck, control may return to step 502. Otherwise, in step 516, the speed control module 247 may provide a signal to the power control module 242 to adjust the power to the motor 202. In other words, the speed control module 247 may generate a control signal to compensate for the difference. In one embodiment, the speed control module 247 adaptively outputs successive control signals to the power control module 242 in order to bring the speed of the motor 202 gradually closer to the desired value.

The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A fan system for a fan, the fan system comprising:
a control housing external to a fan housing for the fan; and
at least one fan control module within the control housing,
wherein the at least one fan control module is connected to terminals within the fan housing via a first plurality of wires,
wherein the at least one fan control module includes a detection module, and wherein the detection module is configured to detect induced voltages in at least one of a plurality of stator coils within the fan housing via the first plurality of wires without receiving signals from a sensor in the fan housing,
wherein the control housing is connected to a host device control module of a host computer via a second plurality of wires, and
wherein the second plurality of wires are separate from the first plurality of wires.

2. The fan system of claim 1, wherein:
the control housing includes a connector;
the connector is connected to the host device control module via a printed circuit board within the host computer;
the connector and the fan housing are separate from the host device control module and the printed circuit board; and
the fan housing is external to the connector.

3. The fan system of claim 1, wherein the induced voltages are generated in response to a back electromotive force.

4. The fan system of claim 3, wherein the at least one fan control module further includes:
a speed control module configured to, based on the induced voltages, provide a signal to adjust a rotational speed of a rotor within the fan housing; and
a power control module configured to selectively provide power signals to the plurality of stator coils based on the signal from the speed control module.

5. The fan system of claim 4, wherein the detection module is configured to detect the back electromotive force in the at least one of the plurality of stator coils when the at least one of the plurality of stator coils is not receiving one of the power signals.

6. The fan system of claim 4, further comprising:
fan blades; and
the fan housing, wherein the fan housing is sensorless, wherein the fan housing houses a fan motor, and wherein the fan motor comprises:
the terminals, wherein the terminals include a first terminal, a second terminal and a third terminal;

a stator including N poles wound with the plurality of stator coils, respectively, wherein N is an integer greater than 1, and wherein each of the plurality of stator coils is connected to one of the terminals; and the rotor is configured to rotate in response to the power signals, wherein the fan blades rotate based on rotation of the rotor.

7. The fan system of claim 6, further comprising the first plurality of wires, wherein:

the first plurality of wires directly connected to one of the terminals without being connected to an intervening printed circuit board;

the first plurality of wires comprises a first wire and a second wire;

the first wire connects to the first terminal and the second terminal; and the second wire connects to the third terminal.

8. The fan system of claim 6, further comprising a sensorless printed circuit board, wherein:

the first plurality of wires are connected to respective ones of the terminals via the sensorless printed circuit board; and the sensorless printed circuit board is mounted within the fan housing.

9. The fan system of claim 6, wherein the fan motor comprises:

a one-phase brushless direct current motor;
a two-phase brushless direct current motor; or
a three-phase brushless direct current motor.

10. The fan system of claim 1, wherein the at least one fan control module is physically accessible without requiring physical access to the fan housing.

11. A fan system comprising:

fan blades;

a fan housing, wherein the fan housing is sensorless, wherein the fan housing houses a fan motor, and wherein the fan motor comprises terminals, a stator comprising N stator coils, wherein N is an integer greater than 1, and N poles wound with the N stator coils, respectively, wherein each of the N stator coils is connected to one of the terminals, and a rotor configured to rotate in response to power signals, wherein the fan blades rotate based on rotation of the rotor;

a control housing external to the fan housing; and a fan control module within the control housing and is connected to the terminals of the stator via a first plurality of wires, wherein the fan control module is configured to control a speed and a direction of the rotor of the fan based on (i) the power signals, and (ii) back electromotive force at the terminals and received in the fan control module via the first plurality of wires, wherein the fan control module controls the speed and the direction without receiving signals from a physical sensor in the fan housing, wherein the fan control module is physically accessible without requiring physical access to the fan housing, wherein the control housing is connected to a host device control module of a host computer via a second plurality of wires, and wherein the second plurality of wires are separate from the first plurality of wires.

12. The fan system of claim 11, further comprising a connector implemented within the control housing, wherein:

the connector is connected to the host device control module via a printed circuit board within the host computer;

the connector and the fan housing are separate from the host device control module and the printed circuit board;

the fan housing is external to the connector; and the back electromotive force occurs when at least one of a plurality of stator coils of the stator is not receiving one of the power signals.

13. The fan system of claim 1, further comprising a power control module configured to supply power to a first one of the plurality of stator coils and not to a second one of the plurality of stator coils, wherein the detection module is configured to detect the induced voltages in the second one of the plurality of stator coils.

14. The fan system of claim 13, wherein the second one of the plurality of stator coils is not supplied power while the detection module detects the induced voltages in the second one of the plurality of stator coils.

15. A fan system for a fan, the fan system comprising:

a control housing external to a fan housing for the fan; and at least one fan control module within the control housing, wherein the at least one fan control module is connected to terminals within the fan housing via a first plurality of wires, wherein the at least one fan control module includes a detection module configured to detect induced voltages in at least one of a plurality of stator coils within the fan housing via the first plurality of wires without receiving signals from a sensor in the fan housing, wherein the detection module is configured to detect the induced voltages in a second one of the plurality of stator coils, a power control module configured to supply power to a first one of the plurality of stator coils and not to the second one of the plurality of stator coils, and a speed control module configured to (i) detect a position of the fan based on the induced voltages in the second one of the plurality of stator coils, and (ii) adjust a first speed of the fan to a second speed based on the position, wherein the first speed and the second speed are greater than zero.

16. The fan system of claim 15, further comprising a current sensing module configured to detect current at each of the plurality of stator coils, wherein the speed control module is configured to detect the position of the fan based on the current of each of the plurality of stator coils.

17. The fan system of claim 15, wherein the speed control module is configured to (i) receive a speed signal from a host control module external to the fan, (ii) compare the speed signal to the speed of the fan, and (iii) adjust the speed of the fan based on a difference between the speed signal and the speed of the fan.

18. The fan system of claim 17, wherein the speed control module is configured to (i) determine whether the fan is not rotating based on the difference between the speed signal and the speed of the fan, and (ii) adjust the speed of the fan when the fan is rotating and the speed signal is not equal to the speed of the fan.

19. A fan system for a fan, the fan system comprising:

a control housing external to a fan housing for the fan; and at least one fan control module within the control housing, wherein the at least one fan control module is connected to terminals within the fan housing via a first plurality of wires, wherein the at least one fan control module includes
- a detection module configured to detect induced voltages in at least one of a plurality of stator coils within the fan housing via the first plurality of wires without receiving signals from a sensor in the fan housing, and
- a speed control module is configured to
  - receive a speed signal from a host device control module external to the fan, wherein the speed signal indicates a first speed greater than zero,
  - compare the speed signal to a second speed of the fan,
  - adjust the second speed based on a difference between the speed signal and the second speed,
  - determine whether the fan is not rotating based on the difference between the speed signal and the second speed,
  - adjust the second speed when the fan is rotating and the speed signal is not equal to the second speed, and
  - based on the difference, refrain from adjusting the second speed when a motor of the fan is stuck.

20. The fan system of claim 11, wherein:
the fan control module comprises a detection module configured to detect induced voltages in at least one of the N stator coils via the first plurality of wires without receiving signals from a sensor in the fan housing; and the fan system further comprises a speed control module configured to (i) detect a position of the fan based on the induced voltages, and (ii) adjust the speed of the fan based on the position.

21. The fan system of claim 1, wherein the fan housing is mounted within the host computer.

22. The fan system of claim 15, wherein:
the control housing is connected to a host device control module of a host computer via a second plurality of wires;
the second plurality of wires are separate from the first plurality of wires; and
the fan housing is mounted within the host computer.

23. The fan system of claim 19, wherein:
the control housing is connected to the host device control module of a host computer via a second plurality of wires;
the second plurality of wires are separate from the first plurality of wires; and
the fan housing is mounted within the host computer.

24. The fan system of claim 19, wherein the speed control module is configured to (i) determine a position of the fan based on the induced voltages, and (ii) refrain from adjusting the second speed based on the position.

* * * * *